United States Patent [19]

Suiter

[11] Patent Number: 4,944,514

[45] Date of Patent: Jul. 31, 1990

[54] FLOOR FINISHING MATERIAL AND METHOD

[75] Inventor: James R. Suiter, Omaha, Nebr.

[73] Assignee: Suitco Surface, Inc., Omaha, Nebr.

[21] Appl. No.: 283,863

[22] Filed: Dec. 13, 1988

Related U.S. Application Data

[63] Continuation-in-part of Ser. No. 940,428, Dec. 11, 1986, Pat. No. 4,795,152, and a continuation-in-part of Ser. No. 203,617, Jun. 6, 1988, Pat. No. 4,867,816, which is a continuation of Ser. No. 871,318, Jun. 6, 1986, abandoned.

[51] Int. Cl.⁵ .................. A63C 19/04; A63D 1/04
[52] U.S. Cl. .................. 273/51; 156/71; 156/159; 272/3; 428/151; 428/203
[58] Field of Search .......... 273/51; 272/3; 156/71, 156/159, 258, 266, 267, 304.1, 304.5; 404/17, 18; 428/151, 203, 204, 205, 343, 908.8, 202

[56] References Cited

U.S. PATENT DOCUMENTS

| | | | |
|---|---|---|---|
| 2,956,703 | 10/1960 | Royal | 156/71 |
| 3,149,693 | 9/1964 | Keller et al. | 156/71 X |
| 4,221,620 | 9/1980 | Milne | 273/51 X |
| 4,591,525 | 5/1986 | Cass | 428/203 X |

Primary Examiner—Anton O. Oechsle
Attorney, Agent, or Firm—Kenyon & Kenyon

[57] ABSTRACT

An improved material for finishing athletic court, commercial, and residential floor surfaces of wood, linoleum, terrazzo, concrete, or other smooth surface includes at least one elongated sheet having a layer of a uniform flexible film of clear plastic material of between about 1 mil and 25 mils thickness and a continuous layer of adhesive material releasably adhering the flexible film onto the floor surface. The elongated sheet is provided in a self-adhesive roll and is applied to the floor surface by unrolling the sheet from the roll, with the adhesive side down, aligning an end portion on a predetermined corresponding portion on the floor, and pressing the total length of the sheet against the floor to adhere the sheet to the floor surface. Additional sheets may be unrolled successively, with a slight overlap to assure an sealed joint. If the sheets are thick enough to create a perceptible ridge, a close fitting butt joint can be created by making a thin knife cut longitudinally through the overlapped edges and stripping away the resulting two edge strips.

8 Claims, 3 Drawing Sheets

FLOOR FINISHING MATERIAL AND METHOD

CROSS-REFERENCE TO RELATED APPLICATIONS

This is a continuation-in-part of U.S. patent applications Ser. No. 06/940,428 filed on Dec. 11, 1986, now U.S. Pat. No. 4,795,152 and Ser. No. 07/203,617 filed on June 6, 1988, now U.S. Pat. No. 4,867,816 and which is a continuation of Ser. No. 06/871,318 filed on June 6, 1986 and now abandoned.

BACKGROUND OF THE INVENTION

The present invention is directed generally to a material and method for quickly and easily producing a transparent wear resistant finish on a smooth flat surface subject to wear and more particularly to a material and method for finishing a floor, such as a wooden athletic game floor. Wooden playing floors for games such as bowling, basketball, squash, and so forth conventionally are finished with clear varnish or urethane applied in liquid form and allowed to air dry or cure to a thin, hard film. These floors require periodic refinishing, which entails sanding off the old finish down to the bare wood and reapplying another coat or coats of liquid finish. The refinishing process requires a high degree of skill to sand the floor flat and to reapply a uniform finish coating.

In addition to the expense, the conventional sanding and refinishing operations are time-consuming and require the floors being worked on to be taken out of service for at least several days. Furthermore, the fumes of natural and synthetic varnishes are disagreeable and even toxic in heavy concentrations, so that respirators or special ventilation may be required for the workmen.

Another disadvantage of conventional refinishing is the practical impossibility of applying a perfectly uniform finish coat even if done by a professional. Finally, the periodic resanding will eventually cause the floor surface to be worn down to the point where the nails securing the floor boards become exposed. At this point, the floor usually must be replaced.

Within the last decade or so, there has been increasing use of stiff laminated synthetic floor panels laid directly on a subfloor in place of conventional wooden flooring. U.S. Pat. No. 4,244,570 of MURRAY, Sr. describes such panels and the procedure for installing them in bowling lanes. U.S. Pat. No. 4,221,620 of MILNE proposes using such panels, or rolls of flexible floor covering material, for larger athletic floor areas such as gymnasiums and basketball courts. The top layer of these panel or roll type of floor coverings may have a photographically reproduced wood grain look, with appropriate court lines pre-inscribed.

The hard surface of the laminated panels is longer wearing than conventionally finished wood floors, but it is difficult to replace a panel that becomes damaged. In addition, there are many existing wooden bowling lanes and other types of game floors that have a long potential life before they need to be replaced.

Accordingly, a primary object of the invention is to provide an improved finishing material and method for wooden floors and for other types of flooring materials in areas subject to heavy wear.

Another object is to provide a material and method for quickly and easily applying a replaceable finish of uniform thickness onto a floor.

Another object is to provide an improved finishing material and method in which a thin film of preselected uniform thickness may be simply unrolled and adhered onto the surface of a floor.

Another object is to provide a method of quickly and easily producing close-fitting butt joints between the edges of sheets of a thin film material applied successively to a floor in adjacent strips.

Finally, another object of the invention is to provide a floor finishing material and method which are inexpensive and efficient and which produce a durable uniform clear finish on the floor surface.

SUMMARY OF THE INVENTION

Resurfacing or finishing a floor is substantially simplified according to the present invention wherein a flexible layer of material is unrolled onto the floor and securely adhered thereto. The flexible layer is preferably an adhesive backed material so that no separate step of applying the adhesive is required. The roll of flexible material is provided in a width that is easy to handle, say 3 to 6 feet, so that many strips of the material are needed to cover a large area such as a gymnasium floor.

A relatively thick layer may be applied as the base coat, or a relatively thin layer may be applied in the same manner as a finish topcoat. In either instance, the applied layer of material may be clear to expose the natural beauty of an underlying surface or may be opaque with a printed pattern to cover old worn surfaces.

DESCRIPTION OF THE PREFERRED EMBODIMENTS

Figure 1:
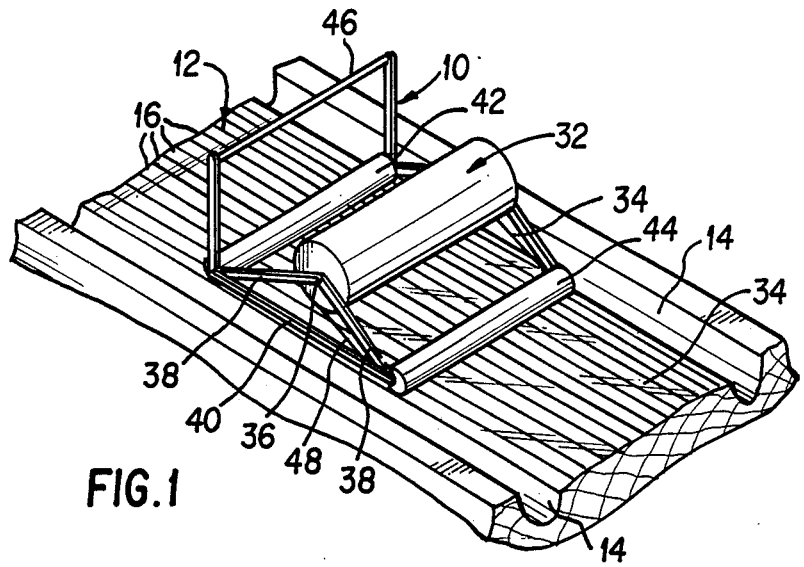
FIG. 1 is a partial perspective view of a bowling lane with a thin sheet of a clear adhesive-backed finish material being applied to the lane surface from a roll of the material in an applicator apparatus.

FIG. 1 illustrates a tape applicator apparatus 10 resting on a conventional wood bowling lane 12 that is situated between a pair of parallel spaced gutters 14. The lane is 42″ wide and has a surface formed by a plurality of edge-laid wood strips 16 interconnected by oppositely facing tongues and grooves (not shown) and secured by nails (not shown).

A novel finish for the wood surface of the bowling lane is provided as a roll 32 of an elongated flexible sheet of clear plastic material 34. "Flexible" is here used to describe the bendability of the sheet but is not intended to imply any degree of stretchability. It is preferred that the material be as stretch resistant as possible and that it be resistant to both impact and wear.

The clear flexible material 34 is preferably adhesive backed. The roll 32 is rotatably supported on apparatus 10 on a cross shaft 36 carried by a pair of support arms 38 which converge upwardly from a frame side member 40 which extends between front and rear rollers 42 and 44. A raised handle structure 46 facilitates movement of the apparatus 10 along the bowling lane 12.

Instead of supporting the roll on a single cross shaft, which must be dismounted and inserted through the center of the roll, it is possible to rest the roll on two spaced apart cross rollers (not shown). This simplifies the procedure for mounting the roll in the apparatus.

In operation, the apparatus is positioned adjacent to one end of the bowling lane 12. A length of about 6 to 12 feet at the outer end of the sheet on the roll preferably has a removable backing sheet, such as waxed paper. This end portion is pulled from the roll and carefully aligned on the lane 12. With this end portion being held in place, the apparatus 12 is advanced along the length of the lane, thereby unrolling the flexible material 34 with the adhesive side 48 facing downwardly so that it can be pressed against the lane's surface by the rear roller 44. After the remainder of the material is adhered to the lane, the waxed paper backing is stripped from the first end portion, which then is pressed down onto the wood surface to complete the installation.

Although the apparatus 10 facilitates the application of the flexible material 34 onto the lane 12, the flexible material could simply be manually unrolled onto the lane's surface without any apparatus. The width of the sheet preferably equals the width of the bowling lane, so that one sheet covers the entire lane, with no need for trimming. The sheet may be unrolled along the full extent of the lane in a single strip, or headers may be covered with a different type of material than that which extends from the headers to the pin deck. For example, it may be desirable to provide the headers with a sheet having a surface that facilitates sliding movement of a bowling ball on the finish layer 34. This can be accomplished either by a very light oil finish or by making the tape of a material impregnated with silicone or the like.

Preferred materials for the flexible finishing sheets of the present invention include polyester, polyurethane, and nylon, but other plastics having suitable qualities of flexibility, resistance to stretching, and wear resistance can be used. Another important physical characteristic, particularly for bowling lane applications, is surface hardness, since this can affect the rolling characteristics of a bowling ball. This characteristic can be varied by appropriate formulation of the plastic, as is known in the plastics art.

Another important aspect of the flexible sheet finishing material of the present invention is that it is much thinner than the laminated panels or flexible floor coverings previously proposed. The sheet material preferably has a thickness in the range of 3–10 mils, although in heavy wear situations it may be as thick as 25 mils.

Figure 5:
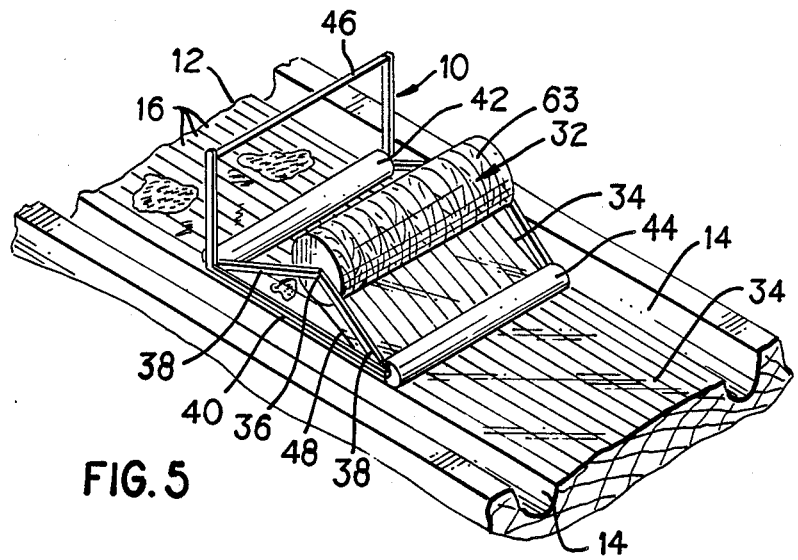
FIG. 5 is a view similar to the view of FIG. 1, but in which the thin clear sheet of adhesive-backed finish material has an apaque decorative layer applied between the sheet material and the adhesive.
Figure 7:
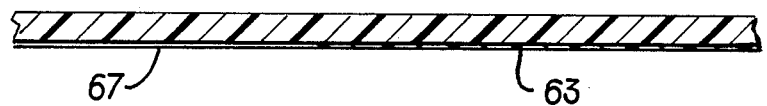
FIG. 7 is an enlarged detail sectional view of the finishing sheet of FIG. 5.

A transparent tape is preferred for exposing the natural beauty of a wood bowling lane, but as shown in FIG. 5, it may be desirable to cover a discolored or patched lane surface with a clear sheet 34 that has an opaque layer 63 displaying a photographically reproduced natural wood pattern and possibly including all of the conventional bowling lane markings. This layer 63 preferably is applied to the undersurface of the sheet 34, as shown is FIG. 7, so that the pattern can be seen through the clear plastic.

For ease and uniformity of application, it is preferred to supply the plastic sheet with an adhesive backing 64. The adhesive could be independently applied to the flexible material, however, or to the lane's surface prior to applying a plain flexible material thereto. An adhesive dispenser and roller applicator could be mounted on the apparatus 10 for uniformly applying the adhesive to the underside of the flexible sheet material or directly to the lane in response to advancing movement of the apparatus.

Whether the adhesive is factory-applied to the sheet or is applied at the time of unrolling the sheet onto a bowling lane or other floor surface, it is important to use an adhesive that adheres at least as well to the sheet as to the application surface, so that when the sheet is ultimately replaced, the adhesive will strip from the surface with the sheet. Adhesion to the sheet material may be enhanced by roughening the surface of the sheet.

When it is time to refinish the lane, the adhesive sheet can be stripped from the lane easily by simply raising a corner, then one end, and then pulling the entire sheet off the lane. If any patches of adhesive are left stuck to the wood, they can be easily wiped off with an appropriate solvent. Then a new finish sheet can be unrolled onto the lane. No resanding is usually required unless dents have to be removed from the wood surface, or unless the lane surface has become transversely dished or tilted out of tolerance, so the wooden lane will not be worn down and should last indefinitely.

As previously described, the finishing material disclosed herein can be applied to surfaces other than bowling lanes. The tapelike finishing sheet of the invention would be a natural for finishing a shuffleboard surface. This type of surface treatment also would be ideal for high traffic areas such as in airports and commercial building hallways, with floors of wood, terrazzo, marble, or other smooth finish material. Another potential application is as a finishing material on residential floors of wood, terrazzo, vinyl, or linoleum. A most important application, however, is to other wood surfaced athletic floors such as basketball courts or general purpose gymnasium floors.

Figure 2:
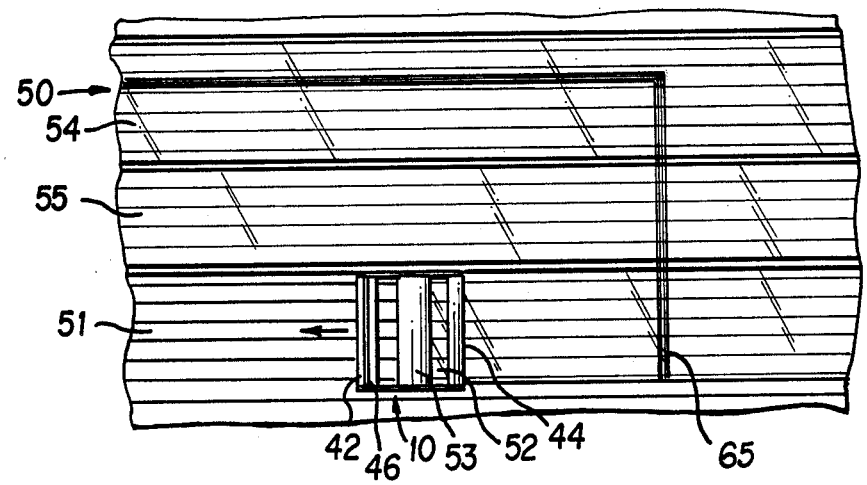
FIG. 2 is a top plan view of a portion of an athletic court floor showing a finishing sheet being applied to overlap a previously applied sheet.

FIG. 2 shows a portion of such a floor 50 composed of parallel tongue and groove boards 51. The procedure for finishing a large gymnasium floor is essentially the same as described above for a bowling lane. Because the size of the floor is too large to be covered by a single sheet of the finishing material, however, it must be finished with multiple parallel sheets laid edge-to-edge. In FIG. 2 a roller applicator 10 is in the process of unrolling a sheet 52 from a roll 53 alongside previously laid down sheets 54, 55 of the same finishing material.

For very thin (1–5 mil) finish sheets, a joint that overlaps by a half inch provides a watertight seal. Since the sheets are so thin, the overlap is invisible and creates no perceptible ridge. To avoid either a dirt collecting gap or a ridge-like overlap when using relatively thick (10–25 mils) sheets, however, it is desirable that the edge of each sheet make a close butt joint with the adjacent edge of the next sheet. Even by using the alignment procedure described in connection with FIG. 1, it is difficult to unroll one sheet in precisely abutting relation to a previous sheet along the full length of the floor. The present invention includes a method for achieving a closely butted joint between adjacent sheets easily and simply.

The method comprises unrolling a sheet of flexible finishing material alongside a previously laid sheet such that one edge of the new sheet overlaps the adjacent edge of the previous sheet. The amount of overlap may be up to about an inch, but this value is not critical.

Figure 3A:
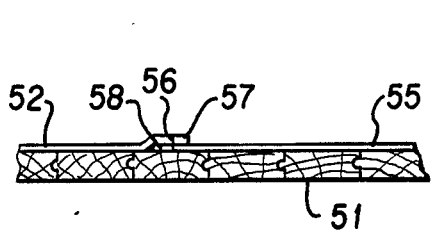
FIGS. 3a, b, and c are enlarged cross-sectional views of a portion of a floor with portions of two overlapping finish sheets, showing successive steps for obtaining a butt joint between the sheets.
Figure 3B:
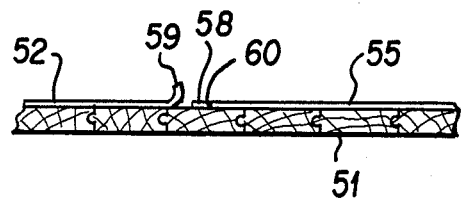
Figure 3C:
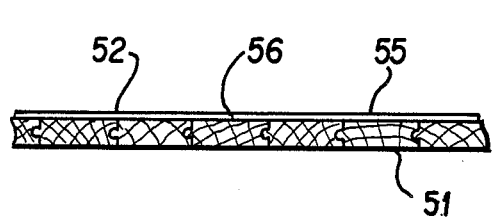

FIGS. 3a, b, and c show in enlarged detail a cross section of the new sheet 52 overlapping the previous sheet 55 to illustrate the method. After the full length of the new sheet is laid down, a longitudinal cut 56 is made with a thin sharp blade through both sheets in the central portion of the overlap region. The cut 56 separates a narrow outside strip 57 from sheet 52 and a narrow outside strip 58 from sheet 55. Strip 57 is peeled away (FIG. 3a), and the new edge 59 of sheet 52 is curled up so that strip 58 also can be peeled away (FIG. 3b). The new edge 59 of sheet 52 is then pressed down against the floor to produce a close fitting butted joint with the new edge 60 of sheet 55 (FIG. 3c). Since the same knife cut creates both new edges after the sheets are adhered to the floor, there will be no gap at the joint even if the cut varies from a straight line and a perpendicular plane.

Figure 4A:
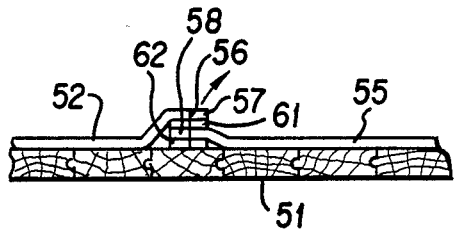
FIGS. 4a, b, and c are enlarged sectional views of an alternative arrangement and procedure to that of FIGS. 3a, b, and c.

FIGS. 4a, b, and c illustrate an alternative embodiment of the edge-butting process of the invention. Since it can be difficult to establish a predetermined overlap between two clear sheets, each roll of finishing material may be furnished with narrow, removable backing strips 61, 62 along the opposite edges of the sheet. These strips are made of waxed paper or other material that is easily stripped from the adhesive coating on the undersurface of the sheet.

Figure 4B:
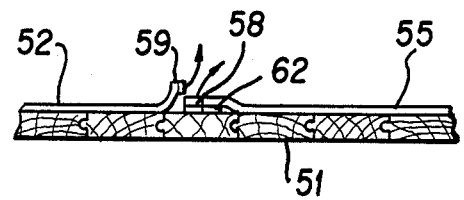
Figure 4C:
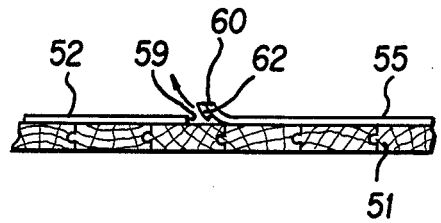

The width of the backing strips is equal to the desired overlap, and they are preferably of different colors, so that when the new sheet is aligned such that the color of its backing strip 61 completely hides the color of the backing strip 62 of the previous sheet, the desired overlap is achieved exactly (see FIG. 4a). After making a longitudinal cut 56 through both sheets and discarding the outside strip 57 and the associated portion of backing strip 61, the new edge 59 of sheet 52 is curled back and the remainder of backing strip 61 is pulled off (FIG. 4b). The outside strip 58 of sheet 55 and its associated portion of backing strip 62 are removed at the same time, and then the new edge 60 of sheet 55 is curled back to pull off the remainder of strip 62 (FIG. 4c) before pressing both new edges into a close fitting butt joint as in FIG. 3c. If desired, strip 62 can be made of thicker or harder material than strip 61, so that the cutting instrument will not penetrate through it. This will protect the floor surface from being cut, and the strip 62 can be removed in one piece together with outside strip 58 of sheet 55.

Because the backing strips 61, 62 are non-adhesive, they make it easier to curl back the new edges of the sheets when removing the outside edge strips. Also, they protect the edges of a sheet on the roll and prevent adhesive from migrating around the edges of adjacent turns on the roll, which could cause the sheet to tear when being unrolled.

Figure 6:
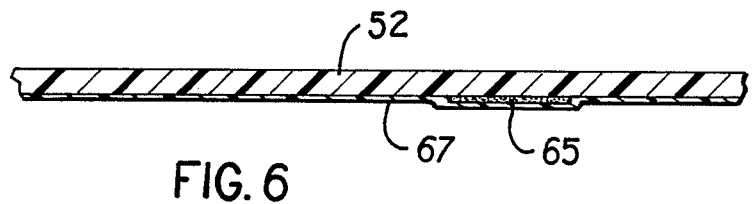
FIG. 6 is an enlarged detail sectional view of the finishing sheet of FIG. 2.

As in the case of a bowling lane application, sheets 53, 53, 54 of the finishing material intended for application on a particular type of athletic court floor can be marked with appropriate boundary lines, team logos, and so forth. As shown in FIG. 6, the markings would be applied to the undersurface of a clear finishing sheet. either alone or in combination with a subsequently applied photographic reproduction of a wood floor, prior to applying the adhesive 67. The edge backing strips of the embodiment of FIG. 5 are helpful in that case since they permit a precise predetermined overlap so that the spacing between markings on adjacent sheets will be maintained accurately. Alternatively, the boundary lines and other indicia can be applied directly to the wood floor, using adhesive tape, adhesive decals or other means, before unrolling the clear finishing sheets onto the floor.

As previously indicated, the flexible finishing sheets of the invention can be applied to high wear floor areas other than athletic floors, and on surfaces other than wood, such as linoleum or terrazzo. They provide a durable finish that is easy to install, to maintain, and ultimately to replace at a reasonable cost.

I claim:

1. A method of providing a durable wear resistant finish on a floor surface, the method comprising:
   (a) providing at least one elongated flexible sheet wound on a roll, the sheet including a layer of clear plastic having a uniform thickness of between about one and about twenty-five mils and a layer of a contact adhesive secured to one side of the plastic layer;
   (b) unrolling an outer end portion of the sheet from the roll;
   (c) placing the outer end portion on the floor with the side having the adhesive layer facing down;
   (d) aligning the end portion on a predetermined corresponding portion of the floor surface;
   (e) unrolling a further amount of the sheet from the roll onto the floor so as to cover a predetermined total length dimension, with the adhesive layer of the sheet in contact with the floor surface; and
   (f) pressing the total length of sheet against the floor to securely adhere the sheet to the floor surface.

2. The method of claim 1 wherein step (a) includes providing a removable nonadhesive layer on the exposed face of the adhesive layer on the outer end portion of the sheet prior to step (c), the method further comprising stripping the nonadhesive layer from the outer end portion after step (e).

3. The method of claim 1, further comprising after step (f):
   unrolling an additional sheet from the at least one roll alongside the first mentioned sheet such that a longitudinal edge of the additional sheet overlaps an adjacent edge of the first mentioned sheet;
   making a single thin cut through the clear plastic layers of both sheets within the overlap region, the cut extending the length of the overlapped edges of the sheets so as to create separate first and second thin strips between the cut and the outer edges of the upper and lower overlapped sheets, respectively;
   peeling away the first thin strip from the line of the cut in the upper sheet;
   curling back the cut edge of the upper sheet to expose the second thin strip;
   peeling away the second thin strip from the line of the cut in the lower sheet; and
   pressing down the cut edges of the two sheets against the floor surface to form a close fitting butted joint between the cut edges of the two sheets.

4. On a floor having a flat top surface and an improved material for finishing the top surface of the floor, the improvement comprising:

at least one elongated sheet including a uniform flexible film of clear plastic material having a thickness between about one mil and about twenty-five mils and a continuous layer of adhesive material disposed between the top surface of the floor and the flexible film, the adhesive layer releasably adhering the flexible film onto the top surface of the floor.

5. The improvement of claim 4 wherein the at least one elongated sheet comprises at least two sheets extending side by side, the two sheets having adjacent longitudinal edges that meet in a close fitting butt joint.

6. The improvement of claim 4 or 5 wherein each elongated sheet includes an opaque decorative layer imprinted on the undersurface of the clear plastic layer between the clear plastic layer and the adhesive layer.

7. The improvement of claim 6 wherein the opaque decorative layer extends over the entire undersurface of the clear plastic layer.

8. The improvement of claim 4 or 5 wherein the at least one elongated sheet includes at least one boundary line affixed to the undersurface of the clear plastic layer.

* * * * *

UNITED STATES PATENT AND TRADEMARK OFFICE
CERTIFICATE OF CORRECTION

PATENT NO. : 4,944,514

DATED : July 31, 1990

INVENTOR(S) : James R. SUITER

It is certified that error appears in the above-identified patent and that said Letters Patent is hereby corrected as shown below:

Title page, item [57]:
Abstract, line 16: change "an" to --a--.

Column 2, line 43: after "sheets;" delete "and".

Column 5, line 61: change "53," to --52,--.

Column 5, line 62: change "53,54" to --54,55--.

Column 5, line 65: after "markings" insert --65--.

Column 5, line 66: after "sheet" delete "." and insert --52,--.

Signed and Sealed this

Twenty-fourth Day of December, 1991

Attest:

HARRY F. MANBECK, JR.

Attesting Officer

Commissioner of Patents and Trademarks

EX PARTE REEXAMINATION CERTIFICATE (8642nd)

United States Patent
Suiter

(10) Number: US 4,944,514 C1
(45) Certificate Issued: Nov. 1, 2011

(54) FLOOR FINISHING MATERIAL AND METHOD

(75) Inventor: James R. Suiter, Omaha, NE (US)

(73) Assignee: Suitco Surface, Inc., Omaha, NE (US)

Reexamination Request:
No. 90/007,015, Apr. 23, 2004

Reexamination Certificate for:
Patent No.: 4,944,514
Issued: Jul. 31, 1990
Appl. No.: 07/283,863
Filed: Dec. 13, 1988

Certificate of Correction issued Dec. 24, 1991.

Related U.S. Application Data

(63) Continuation-in-part of application No. 06/940,428, filed on Dec. 11, 1986, now Pat. No. 4,795,152, and a continuation-in-part of application No. 07/203,617, filed on Jun. 6, 1988, now Pat. No. 4,867,816, which is a continuation of application No. 06/871,318, filed on Jun. 6, 1986, now abandoned.

(51) Int. Cl.
*A63D 1/04* (2006.01)
*A63C 19/04* (2006.01)

(52) U.S. Cl. .......................... 473/117; 156/71; 156/159; 428/203; 428/151

(58) Field of Classification Search ........................ None
See application file for complete search history.

(56) References Cited

To view the complete listing of prior art documents cited during the proceeding for Reexamination Control Number 90/007,015, please refer to the USPTO's public Patent Application Information Retrieval (PAIR) system under the Display References tab.

*Primary Examiner*—Beverly M. Flanagan

(57) ABSTRACT

An improved material for finishing athletic court, commercial, and residential floor surfaces of wood, linoleum, terrazzo, concrete, or other smooth surface includes at least one elongated sheet having a layer of a uniform flexible film of clear plastic material of between about 1 mil and 25 mils thickness and a continuous layer of adhesive material releasably adhering the flexible film onto the floor surface. The elongated sheet is provided in a self-adhesive roll and is applied to the floor surface by unrolling the sheet from the roll, with the adhesive side down, aligning an end portion on a predetermined corresponding portion on the floor, and pressing the total length of the sheet against the floor to adhere the sheet to the floor surface. Additional sheets may be unrolled successively, with a slight overlap to assure a sealed joint. If the sheets are thick enough to create a perceptible ridge, a close fitting butt joint can be created by making a thin knife cut longitudinally through the overlapped edges and stripping away the resulting two edge strips.

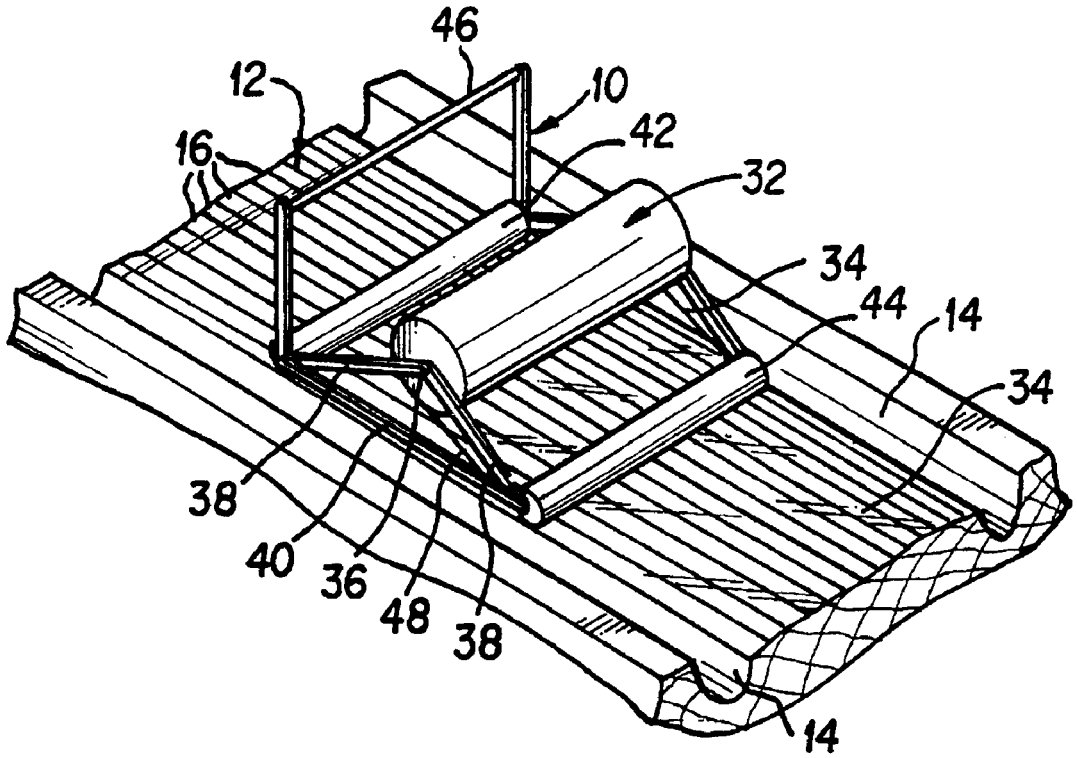

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *